(No Model.) 6 Sheets—Sheet 1.

T. CARNEY.
CASH REGISTER AND INDICATOR.

No. 497,860. Patented May 23, 1893.

Witnesses
Martin H. Olsen
Albert H. Meade

Inventor
Thomas Carney
by Edward Rector
his atty.

(No Model.)

6 Sheets—Sheet 3.

T. CARNEY.
CASH REGISTER AND INDICATOR.

No. 497,860.

Patented May 23, 1893.

Witnesses
Martin H. Olsen
Albert H. Meade

Inventor
Thomas Carney
by Edward Rector
his atty (No Model.) 6 Sheets—Sheet 5.

T. CARNEY.
CASH REGISTER AND INDICATOR.

No. 497,860. Patented May 23, 1893.

Witnesses
Martin H. Olsen
Albert H. Meads

Inventor
Thomas Carney
by Edward Reitor
his atty.

(No Model.)  6 Sheets—Sheet 6.
T. CARNEY.
CASH REGISTER AND INDICATOR.
No. 497,860.  Patented May 23, 1893.
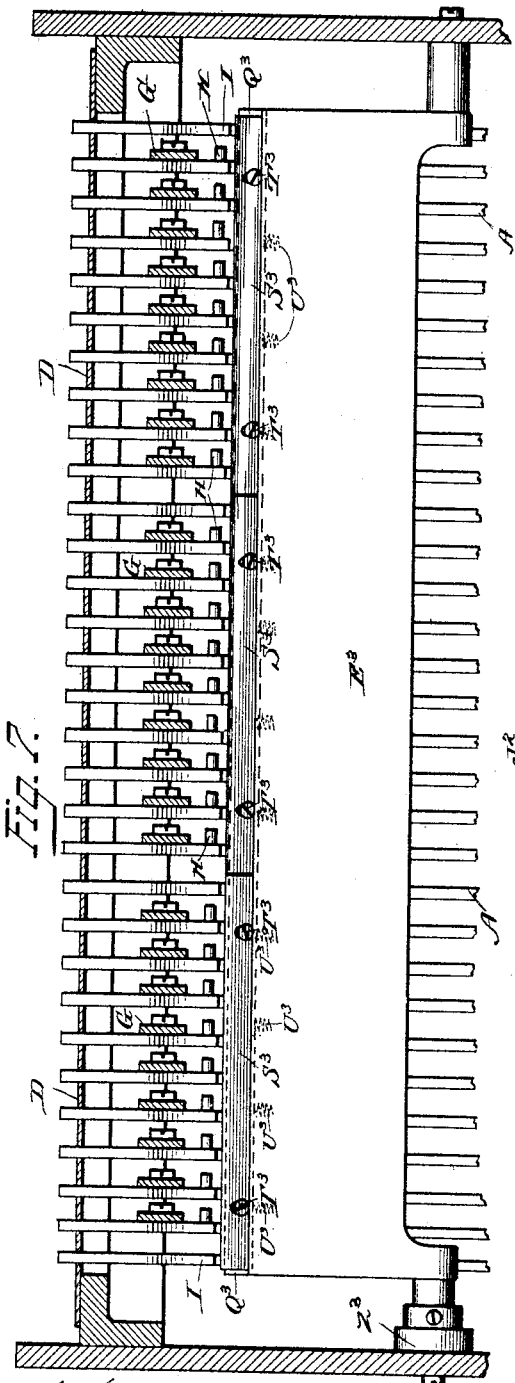
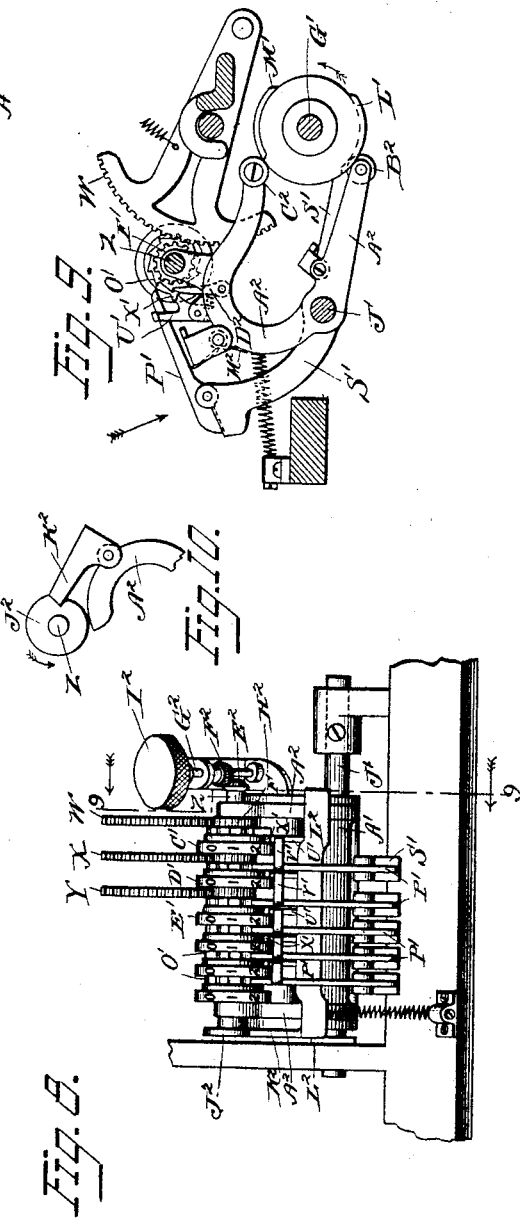
Witnesses
Martin A. Olsen.
Albert H. Meads
Inventor
Thomas Carney
by Edward Rector
his atty

UNITED STATES PATENT OFFICE.

THOMAS CARNEY, OF DAYTON, OHIO, ASSIGNOR TO THE NATIONAL CASH REGISTER COMPANY, OF SAME PLACE.

CASH REGISTER AND INDICATOR.

SPECIFICATION forming part of Letters Patent No. 497,860, dated May 23, 1893.

Application filed December 21, 1892. Serial No. 455,932. (No model.)

*To all whom it may concern:*

Be it known that I, THOMAS CARNEY, a citizen of the United States, residing at Dayton, in the county of Montgomery and State of Ohio, have invented a certain new and useful Improvement in Cash Registers and Indicators, of which the following is a specification, reference being had to the accompanying drawings, forming part of this specification.

My invention relates to novel means for transmitting different portions of the uniform movements of the keys to the registering devices, to register the different values of the keys; to novel means for connecting the registering devices with and disconnecting them from the operating keys or parts actuated by said keys; to novel means for coupling together several operated keys in different sets or banks; to novel means for converting the reciprocating movements of the operating keys, or a part actuated by them, into rotary movement in a shaft or other parts; to a novel arrangement of the indicators; and to various novel constructions, combinations and modes of operation of the several parts, all as will be hereinafter set forth and particularly pointed out in the claims.

Figure 1:
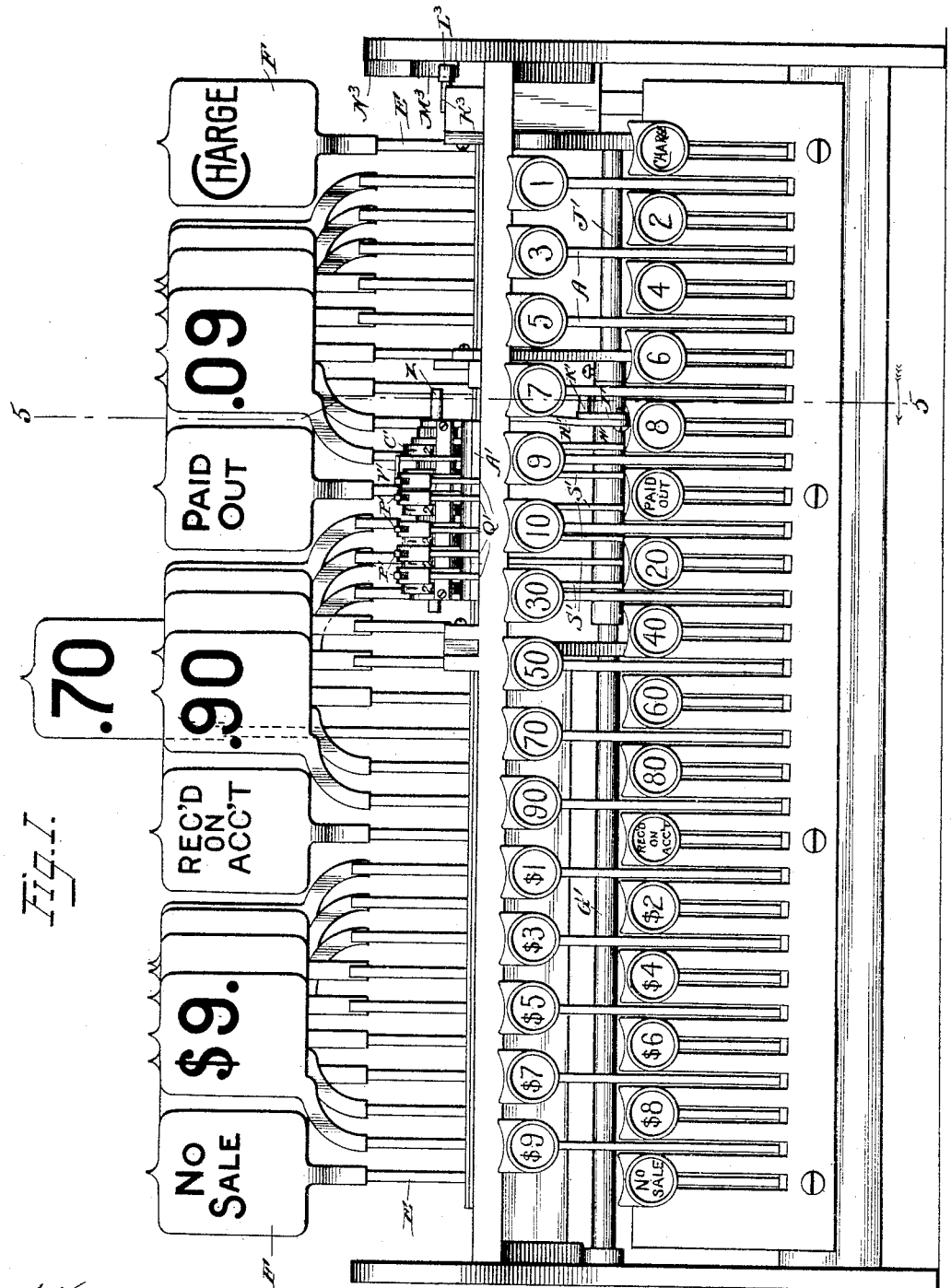
Figure 2:
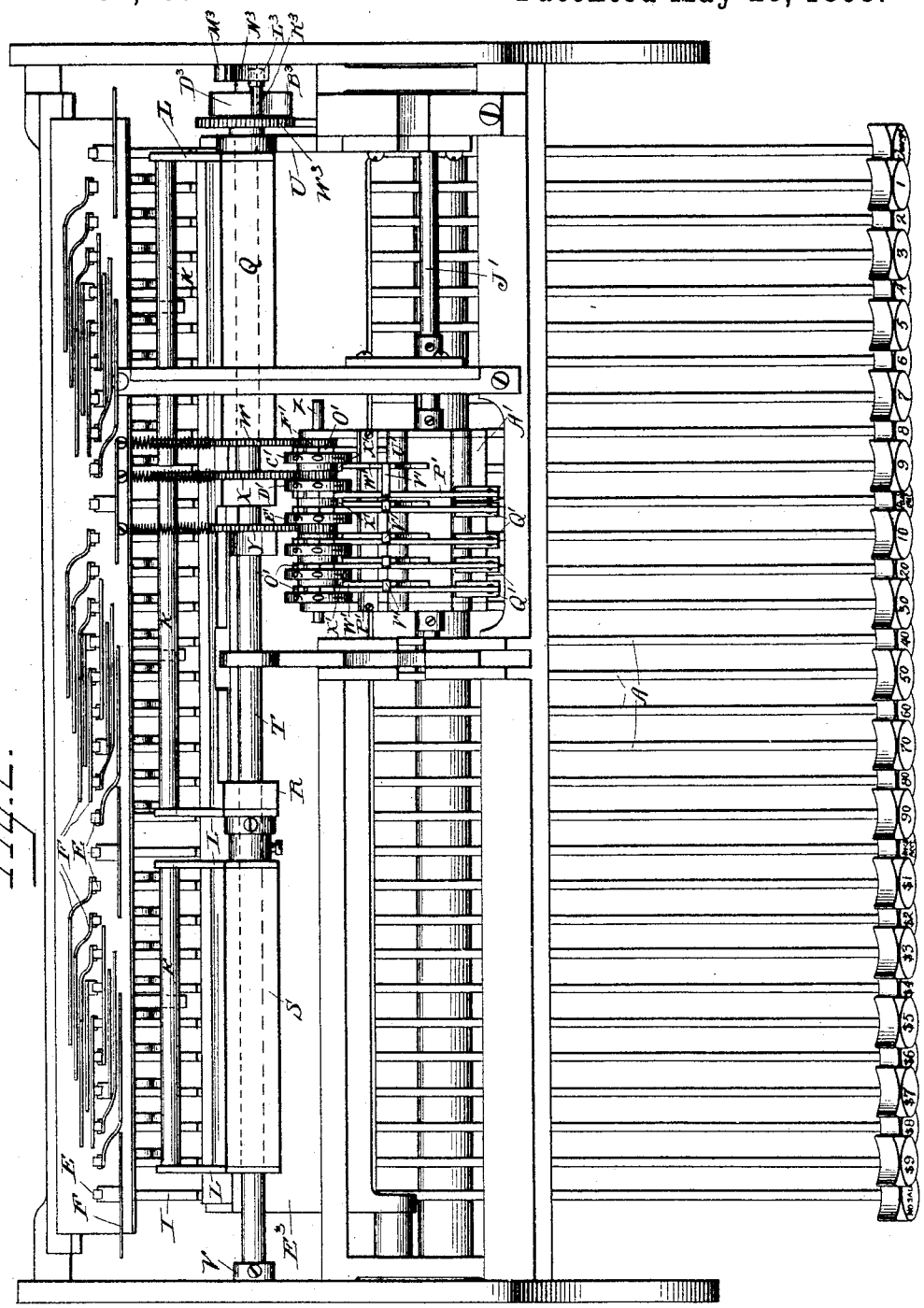
Figure 3:
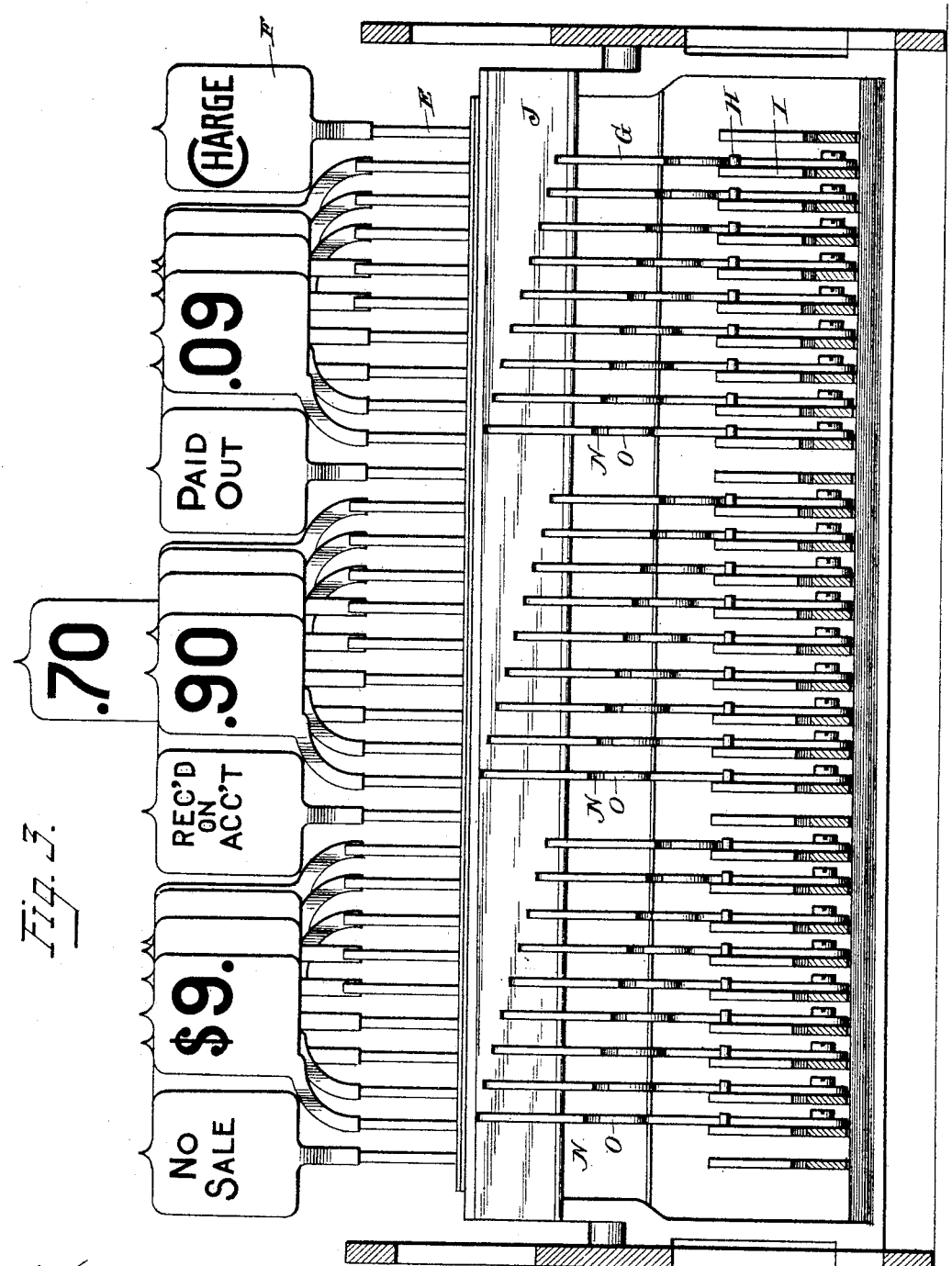
Figure 4:
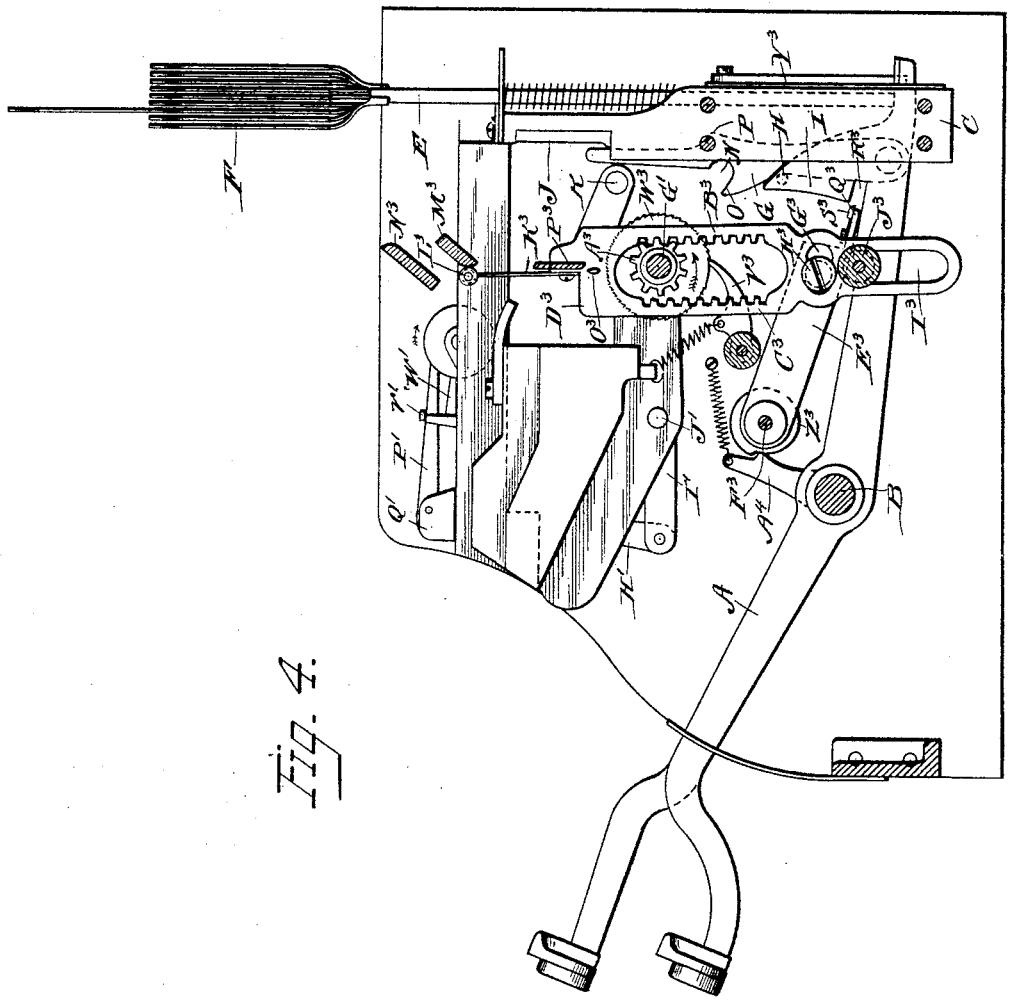
Figures 5, 6:
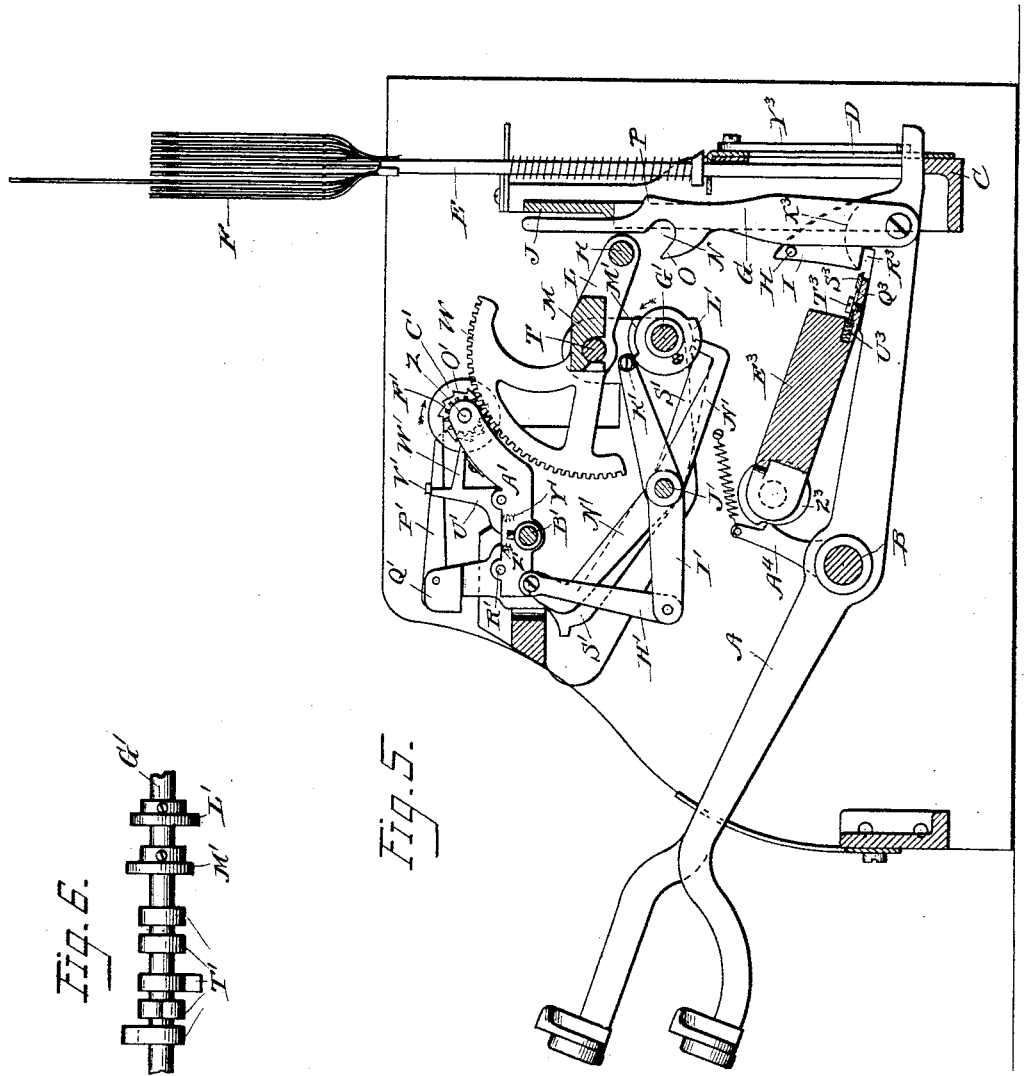

In the accompanying drawings Figure 1 represents a front elevation of my new machine, removed from its casing; Fig. 2, a top plan view of the same; Fig. 3, a transverse vertical section near the rear ends of the operating keys; Fig. 4, a vertical section just within the right hand side frame of the machine, looking toward the left; Fig. 5, a vertical section approximately on the line 5—5 of Fig. 1; Fig. 6, a detail view of the cams upon the rotary shaft; Fig. 7, a sectional plan view of the lower rear portion of the machine, showing the rear ends of the key levers, the vibrating frame and coupling devices; Fig. 8, a front view of a modified arrangement of the registering devices, looking at the parts in the direction of the arrow in Fig. 9; Fig. 9, a side elevation of the parts shown in Fig. 8 to the left of the line 9—9 of said figure; and Fig. 10, a detail of the left hand end of the parts shown in Fig. 8.

The same letters of reference indicate identical parts in all the figures.

Several features of my invention are more particularly adapted to machines in which are employed several sets of operating keys, each set representing the nine digits, or multiples thereof in regular order, and in the present instance I have illustrated a machine in which three such sets of keys are employed, the first set upon the right representing units of cents, from 1 to 9 inclusive, the next or middle set tens of cents, from 10 to 90 inclusive, and the third or left hand set units of dollars, from 1 to 9 inclusive; as shown in Fig. 1. Between these sets of keys are in this instance arranged two special keys, serving to separate the three sets, and there is also a special key at each end of the machine. These operating keys consist of levers A fulcrumed on a shaft B and resting at their rear ends upon a crosspiece C of the framework in vertical slots in the usual guide-plate D. Resting upon their rear ends are the vertically-guided rods E which carry the indicators F. These indicators bear numbers and signs corresponding with their respective keys.

The different portions of the uniform movements of the operating keys necessary to register their respective values upon the registering devices are transmitted to those devices by means of a series of graduated plates or lifters G, which are pivoted at their lower ends to the sides of the keys near the rear ends of the latter. These plates may be guided in their vertical movement in any suitable manner. In the present instance when in normal position their forward edges rest against pins H upon the sides of the vertical extensions I of the key levers, while their upper rear edges rest against a cross piece J of the framework. The plates are capable of slight forward and backward movement upon their pivotal supports when they are lifted by the operations of the keys, the pins H being carried away from their front edges by the upward movement of the rear ends of the keys, and thus permitting the plates to be thrown slightly forward in the manner hereinafter explained.

The plates G are adapted to co-operate with the horizontal rods K of the registering frames, of which frames there are three, one for each set of keys, and each composed of its rod K, side arms L, by which the frame is hung upon its pivotal support, and a cross-piece or bracebar M connecting the front ends of the side arms L. The plates G are provided in their forward edges with notches N, at the bases of which are forwardly-projecting lifting fingers or shoulders O. The notches N and shoulders O upon the plates of each set are arranged at gradually increasing distances from the lower ends of the plates, proceeding from right to left, and consequently at gradually decreasing distances from the rod K of the registering frame with which they co-operate; as seen in Fig. 3. When the operating keys are at rest the lifting shoulders O stand in transverse line immediately beneath the rods K of the respective registering frames, the plates being held in this normal position by the pins H upon the keys and the cross-bar J of the framework. The plates G are provided on their rear edges with beveled shoulders P approximately in line with the respective notches N, and these shoulders are adapted to co-operate with the lower edge of the cross-bar J, the latter in this instance being rounded or having a bead formed upon it and co-operating as a cam with the shoulders P upon the plates G. Under this arrangement of the parts, whenever the front end of any operating key is depressed and its rear end lifted the upward movement of the plate G carried by said key will not affect the corresponding registering frame until the lifting shoulder O of the plate engages the rod K of said frame. Just before said shoulder engages the rod the shoulder P upon the rear edge of the plate will engage the lower edge of the cross-piece J and the plate G will be thrown forward, causing its notch N to embrace the rod K and thereby lock the plate to the rod. From this point onward during the stroke of the key the rod K will be lifted by the plate G, and the shape of the rear edge of each plate G is such that its engagement with the lower edge of the cross piece J will hold its notch N engaged with the rod K, so that the plate is locked to the rod K from the moment its lifting shoulder O engages said rod until the key completes its stroke and the parts return to that position again. It will thus be seen that the lifting plate G of any operated key becomes locked to the corresponding registering frame at the moment the plate engages and begins to move said frame, so that it is absolutely impossible for the frame to be thrown ahead of the lifting plate and operated key and be carried too far by its own momentum. It cannot be moved farther than the distance between the point of engagement of the plate G of the operated key and its rod K and the point to which the plate G is moved by the complete stroke of the key, so that by arranging the notches N and lifting shoulders O in proper relation to the rods K of the registering frames, the latter may be given the exact movement necessary to register the values of the respective keys, and any excess of movement, from violent operation of the machine or otherwise, effectually prevented. It will be evident that, given this positive and perfect graduated movement of the registering frames, any suitable registering devices may be employed in connection with said frames; and the novelty of my invention in this respect consists in the novel means for coupling the keys or lifting plates to the registering frames and giving the latter their variable movements. It will be seen that the plates G have the same uniform movement as the keys, being pivoted directly to the latter, but they might be supported in suitable guides and not be connected directly to the keys, it being only necessary that the plates shall become automatically coupled or locked to the registering frames at the moment they engage and begin to move said frames. It will be also understood that a rod or any other suitable cross-piece acting as a cam would serve the purpose of the cross-piece J in its co-operation with the shoulders P on the lifter-plates. Likewise, the pins H upon the keys, while they serve to throw the plates G of the operated keys back to normal position at the ends of the return strokes of such keys, might be omitted. The only essential parts of this combination are the operating keys, the plates or lifters G, the plate J or equivalent part co-operating with the plates G, and the registering frame. So far as I am aware I am the first in the art to combine a series of operating keys of different values with a registering frame by any sort of connecting devices which serve to couple the keys to said registering frame at the beginning of movement of said frame and to impart different degrees of movement to the frame proportionate to the values of the operated key, whereby a definite and positive movement is imparted to said frame and any excess of movement due to momentum of the parts absolutely prevented, and I desire to claim such combination and mode of operation broadly, without regard to the character of the registering frame or the particular form of the connecting devices between said frame and the operating keys.

The three registering frames, which I will designate by the letters Q, R, S, respectively, are shown in Fig. 2. They are all mounted upon a shaft T journaled at its right hand end in a fixed plate U carried by the framework and at its left hand end in a bearing V upon the side frame. The frame Q is loosely hung by its side arms L upon the shaft T, as is also the frame R, while the frame S is fast upon said shaft. The frame Q carries at its left hand end a toothed segment W; the frame R carries a like segment X at its right hand end, adjacent to the segment W; while fast upon the shaft T at the left of the segment X is a third segment Y which is actuated by the frame S through the medium of the shaft T. These segments drive the registering wheels, which in this instance are mounted upon a shaft Z carried in the upper rear end of a frame A' fulcrumed on a shaft B' fixed in the framework. The first, second and third registering wheels C' D' E' mounted on the shaft are provided with pinions F' fast upon their sides and adapted to co-operate with the segments W, X and Y respectively. By the means hereinafter described the frame A' which carries the registering wheels is rocked upon its fulcrum shaft B' at the opposite ends of the strokes of the operating keys, so that during the strokes of the keys in one direction the pinions F' will be engaged with the segments W, X and Y, and during the strokes of the keys in the opposite direction they will be disengaged from them. Under the arrangement shown in the drawings the pinions are normally out of mesh with the segments, and are arranged to be thrown into mesh with them at the beginning of the downward strokes of the keys, so that the differential movements imparted to the registering frames by the lifter plates G will be transmitted by the segments to the registering wheels. At the ends of the downward strokes of the keys, or at the beginning of their return strokes, the frame A' is rocked upon its fulcrum and the pinions F' carried out of engagement with the segments, so that during the return movement of the latter the registering wheels remain stationary.

Under the construction shown in the drawings the means for oscillating the frames A' consists of cams fast upon a rotary shaft G', Figs. 5 and 6 which shaft is given a complete revolution at each complete operation of a key (half during its positive stroke and half during its negative) by means hereinafter described. As seen in Fig. 5 the forward end of the frame A' is connected by a link H' with the front end of a lever I' fulcrumed on a shaft J' and carrying upon a laterally projecting stud at its rear end a friction roller K' which bears against and co-operates with a cam L' fast upon the shaft G'. When the parts are in their normal positions of rest the engagement of the cam L' with the friction roller K' on the lever I' holds the rear end of the frame A' tilted upward and the pinions F' out of engagement with the segments, but at the beginning of the downward stroke of the operated key and forward revolution of the shaft G' the cam L' is carried from under the roller K', so that the rear end of the frame A' is free to be moved downward and the pinions F' thrown into mesh with the segments. The frame is tilted, to effect this result, by means of a second cam M' fast upon the shaft G' at the left of the cam L', Fig. 6. This cam M' co-operates with the rear end of the lever N' whose upper and forward end engages the under side of the front end of the frame A', so that when the rear end of the lever is thrown downward by the cam M' its forward end is thrown upward, thereby tilting the frame A' and throwing the rear end of the latter downward and engaging the pinions F' with the segments. In this manner the pinions are engaged with the segments during the downward strokes of the keys, but at the beginning of the return upward strokes of the keys the cam M' is carried out of engagement with the lever N' and the cam L' engages the roller K' on the lever I' and forces the rear end of the latter upward and pulls down the front end of the frame A' and disengages the pinions from the segments, the parts remaining in this position when the parts come to rest, as seen in Fig. 5.

While under the arrangement I have illustrated the driving pinions of the registering wheels are normally out of mesh with the segments and are thrown into mesh with them at the beginning of the positive strokes of the keys, yet, if desired, the pinions may be thrown into mesh with the segments at the ends of the return strokes of the keys instead of at the beginning of their positive strokes. Again, if desired, the pinions may be held out of mesh with the segments during the entire positive strokes of the keys and be thrown into mesh with them at the ends of such strokes so that the segments will turn the pinions and registering wheels during the return movement of the parts instead of during their positive movements. Again, while I prefer to move the frame A' positively in both directions, by means of two cams L' M' and their connections, yet it is evident that the frame might be given its movement in one direction by a spring, in which case only one cam need be employed.

So far as I am aware I am the first in the art to combine a series of operating keys of different values, an oscillatory segment actuated thereby and moved different degrees proportionate to the values of the respective keys, and a registering wheel mounted in a movable frame and provided with a driving pinion arranged to be thrown into and out of mesh with the segment for the purpose of causing the latter to turn the registering wheel during its stroke in one direction and allow it to remain stationary during its stroke in the opposite direction; and I desire to claim this combination and mode of operation broadly, without regard to the character of the mechanism interposed between the operating keys and segment or the means for throwing the pinion and segment into and out of engagement with each other.

In addition to the three registering wheels which are actuated directly by the segments, there are shown three additional wheels at the left thereof and mounted upon the same shaft Z. The numbers upon these latter wheels represent respectively tens, hundreds and thousands of dollars. Each wheel registers its complete revolutions upon the next higher wheel in the set by means of suitable transfer mechanism, that employed in the present instance being as follows:

Each of the wheels has fast upon its side a ratchet O', and with the ratchet of each wheel except the right hand one co-operates a transfer pawl P'. These pawls are pivoted at their front ends in plates Q' which are pivoted in the frame A' at R', Fig. 5, and extend below the latter into position to be engaged by the front ends of levers S' fulcrumed on the shaft J' before referred to and co-operating at their rear ends with a series of cams T', Fig. 6, fast upon the shaft G'. The cams T' are arranged spirally around the shaft G', so that during the revolution of the latter the rear ends of the levers T' will be successively depressed and the transfer pawls P' successively thrown rearward. The pawls P' are normally held out of engagement with the ratchets O' by latches U', which are pivoted in the frame A' and upon the upper ends of which rest laterally projecting lugs V' upon the pawls P'. The latches U' are provided with rearwardly projecting fingers W' which stand in the path of travel of projections or cams X' upon the respective registering wheels, Figs. 2 and 9, there being one cam projection upon each registering wheel arranged in such position that when the wheel completes a revolution and brings its zero to the reading point its cam X' will engage and lift the finger W' and thereby throw forward the upper end of the latch U' from beneath the lug V' on the transfer pawl for the next higher wheel, so that said pawl will drop and its rear end will rest upon the ratchet of such wheel. When the cam X' has cleared the finger U' of the latch a spring Y' bearing against the under side of the latch (shown in dotted lines in Fig. 5), will throw the latch back toward normal position, but the lug V' on the transfer pawl having dropped behind its upper end it cannot return entirely to normal position until after the pawl has been thrown rearward and the transfer effected. The transfer pawl having been set in the manner described, it is thrown rearward, to effect the transfer, by its co-operating cam on the shaft G' during the further revolution of the latter. The turning of the ratchet by the pawl causes the tooth of the ratchet succeeding the one with which the pawl is engaged to lift the rear end of the pawl high enough to carry the lug V' above the plane of the upper end of the latch U', so that when the pawl is retracted (by the action of springs Z' bearing against the under sides of the plates Q') the lug V' will pass above the upper end of the latch U' and when the rear end of the pawl clears the tooth of the ratchet upon which it had been resting the pawl will be supported by the engagement of the lug V' with the upper end of the latch. In this manner all of the transfer pawls P' are thrown rearward by the cams T' at each operation of the machine, but only those pawls which have been set for a transfer will actuate their co-operating registering wheels, the remaining pawls playing idly back and forth.

In Figs. 8 and 9 a modified form of the frame A' for the registering wheels is shown, with a different arrangement of the transfer pawls and a different connection of the frame with the cams upon the shaft G'. In those figures the frame A' is composed of side plates A² hung upon the shaft J' and connected by suitable cross-rods or braces. The shaft Z which carries the registering wheels is mounted in ears upon the upper sides of the plates A². The rearwardly extending ends of the right hand side plate carry friction rollers B² C² which co-operate respectively with the cams L' M' on the shaft G', so that the levers I' N' employed in the construction above described are dispensed with.

As seen in Fig. 9, when the parts are in normal position the engagement of the cam L' with the roller C² holds the frame in its upper and forward position, with the pinions of the registering wheels out of mesh with the segments. At the first movement of the shaft G' and segments L' M' in the direction of the arrow the cam L' is carried from under the roller C² and the shoulder of the cam M' engages the roller B² and depresses the rear end of the frame, throwing the upper end of the frame rearward and engaging the pinions with the segments. The engagement of the cam M' with the roller B² holds the pinions in engagement with the segments until after the positive strokes of the keys are completed. At the beginning of the return strokes of the keys and second half of the revolution of the shaft G' the cam M' is carried away from the roller B² and the shoulder of the cam L' engages the roller C² and lifts the rear end of the frame again and disengages the pinions from the segments.

In the construction shown in Figs. 8 and 9 the pivoted plates Q' employed in the construction shown in Fig. 5 are dispensed with and the transfer pawls P' are pivoted directly to the upwardly curved ends of the levers S' whose rear ends co-operate with the cams T' upon the shaft G'. The latches U' are slightly different in form in Fig. 9, but co-operate with the cams X' upon the registering wheels and with the transfer pawls in the same manner as do the latches in Fig. 5.

In Fig. 9 are shown retaining pawls D² spring-pressed into engagement with the ratchets O' of the registering wheels, to prevent backward movement of the latter. Similar retaining pawls are employed in the construction shown in Fig. 5, but are not illustrated.

There is also illustrated in Figs. 8 and 9 a means for turning the registering wheels to zero. As before stated the shaft Z is a rotary one, and in the construction shown in Figs. 8 and 9 it has fast upon its right hand end a beveled pinion E² which meshes with a second beveled pinion F² fast upon a vertical spindle G² mounted in a bracket H² upon the side plate A² of the frame A'. The upper end of the spindle G² has fastened upon it a thumb piece I² by which it may be turned. Interposed between the registering wheels and the shaft Z are pawls, of any usual or suitable form and arrangement, which co-operate with the shaft and wheels to permit the wheels to be turned freely in one direction upon the shaft, but to cause the shaft to pick up the wheels and turn them when the shaft is itself turned in the same direction, as is common in registering devices. Fast upon the extreme left hand end of the shaft Z is a notched disk $J^2$, Fig. 10, with which co-operates an arm $K^2$ upon the left hand end of a cross piece or frame $L^2$, which is pivoted at its opposite ends to the side plates $A^2$ of the frame. A spring $M^2$, Fig. 9, coiled around the pivotal support of the frame $L^2$ at its right hand end and bearing against the side plate $A^2$ and the forward edge of the frame $L^2$ presses the latter rearward and holds the arm $K^2$ against the disk $J^2$. Under this construction and arrangement, when it is desired to set the registering wheels at zero it is simply necessary to turn the thumb-piece $I^2$ until the shaft Z has been given a complete revolution and the spring-pressed arm $K^2$ of the frame $L^2$ snaps into the notch in the disk $J^2$ again. The provision of the disk $J^2$ and arm $K^2$ enables the operator to easily tell when the wheels have been turned to zero without carefully watching their numbers as they pass beneath the reading openings in the casing, and renders him less liable to turn the wheels past the zero point.

The means for rotating the shaft $G'$ is shown in Fig. 4, and may be described as follows: The shaft has fast upon its right hand end a pinion $A^3$ with which co-operate two reciprocating racks $B^3$ $C^3$ formed upon a plate $D^3$ which is carried by the usual vibrating frame $E^3$ pivoted by its side arms to the framework at $F^3$ and resting upon the upper sides of the key levers near their rear ends. The plate $D^3$ is provided with a horizontal slot $G^3$ through which passes a stud or screw $H^3$ entering the end of the frame $E^3$, so that while the plate $D^3$ is lifted by the frame $E^3$ it is capable of slight oscillatory movement. The lower end of the plate $D^3$ is provided with a vertical slot $I^3$ which embraces a stud $J^3$ upon the side frame of the machine and by which the plate $D^3$ is guided in its vertical movements. At its upper end the plate $D^3$ has secured to it a vertically extending spring-arm $K^3$ which carries at its upper end a friction roller $L^3$, which co-operates with two inclined lugs $M^3$ $N^3$ formed upon the inner face of the side frame of the machine. The plate $D^3$ is also provided with a projection $O^3$ which co-operates with a guide-rib $P^3$ formed upon the inner face of the side-frame.

Under the above construction and arrangement of the parts the operation is as follows: In normal position the engagement of the roller $L^3$ on the spring-arm $K^3$ with the lug $M^3$ holds the plate $D^3$ in its forward position, with the rack $B^3$ engaged with the pinion $A^3$. When the front end of any key lever is depressed and the vibrating frame $E^3$ and plate $D^3$ thereby lifted the rack $B^3$ turns the pinion $A^3$ and shaft $G'$ in the direction of the arrow, the projection $O^3$ upon the plate $D^3$ traveling up the forward side of the guide rib $P^3$. When the roller $L^3$ upon the spring-arm $K^3$ comes in contact with the lug $N^3$ and is forced rearward as it travels upward against the rear inclined side of said lug it tends to throw the plate $D^3$ rearward, but the engagement of the projection $O^3$ with the guide rib $P^3$ prevents movement of the plate $D^3$ in this direction until said projection clears the upper end of the rib, whereupon the spring-arm $K^3$, which has been put under tension by the engagement of the shoulder $L^3$ with the lug $N^3$, will throw the plate $D^3$ rearward and engage the rack $C^3$ with the pinion $A^3$. During the return movement of the parts the rack $C^3$, in its downward movement, will continue to turn the pinion $A^3$ in the same direction in which it had been turned by the upward movement of the rack $B^3$, and complete its revolution. The projection $O^3$ upon the plate $D^3$ travels downward upon the rear side of the guide rib $P^3$. When the roller $L^3$ upon the spring-arm $K^3$ engages the lug $M^3$ in its downward movement it tends to throw the plate $D^3$ forward again, but the engagement of the projection $O^3$ with the rear side of the guide-rib $P^3$ prevents such movement of the plate $D^3$ until the projection has cleared the lower end of the rib, whereupon the plate $D^3$ is thrown forward again to normal position and the rack $C^3$ disengaged from the pinion and the rack $B^3$ re-engaged with it; as seen in Fig. 4.

The means above described for converting the reciprocating movements of the keys and vibrating frame into rotary movement in the pinion $A^3$ and shaft $G'$ may be employed in other relations where it is desired to convert reciprocating into rotary movement.

The next feature of my invention relates to a novel means for coupling together displaced or slightly depressed keys in the several sets or banks, by means of which it is possible to start a key in one set and release it (remove the hand or finger from it), and then complete its operation by depressing a key in another set; or, when desired, to start a key in one set and release it, then start a key in another set and release it, and then complete the operation of both keys by fully depressing a key in the third set; enabling any indication and registration of which the machine is capable to be made with one hand.

The vibrating frame $E^3$ is provided with a rearwardly-projecting flange $Q^3$ adapted to co-operate with slots $R^3$ in the vertical extensions I of the key levers. This flanged frame $E^3$ and the slotted extensions I of the key levers constitute a well-known form of key coupler, but with these parts alone, as heretofore employed, it was necessary to start all of the operated keys at the same time, thereby coupling all of them to the vibrating frame, after which the operation of all could be completed by fully depressing any one of them, but it was not possible to start them in succession and complete the operation with one, in the manner above explained. For that purpose I have provided an auxiliary device for each set of keys, consisting of a thin plate $S^3$ resting upon the flange $Q^3$ of the vibrating frame and held in position and allowed limited play thereon by screws $T^3$ passed through slots in the plate. The plate $S^3$ is normally pressed rearward to its limit of movement by springs $U^3$, in this instance confined in a longitudinal slot in the frame $E^3$, Fig. 5. As seen in Fig. 7 there are three of these spring-pressed plates $S^3$ mounted upon the flange $Q^3$ of the vibrating frame, one overlying each set of key levers A, and the operation of the parts is as follows: When the front end of any key lever is slightly depressed and the vibrating frame thereby lifted the rear edge of the plate $S^3$ overlying said key will enter the slot $R^3$ in the extension I of said key, and the key will thereby become coupled to the vibrating frame. When the slightly depressed key is released the parts are held in the position to which they have been moved by means of a pawl $V^3$, Fig. 4, which engages a ratchet $W^3$ fast upon the shaft $G'$, as is common in machines of this class. Upon now depressing a key in another set the front edge of its extension I will engage the rear edge of the plate $S^3$ which overlies said key and will force said plate forward until the slot $R^3$ is brought opposite the edge of the plate, whereupon the latter will spring into the slot and the key be thereby coupled to the vibrating frame. If the amount to be indicated and registered is such that the operation of a key in the third set is required it may be coupled to the vibrating frame in the same manner, and then the operation of all three of the keys completed by depressing any one of them.

For the purpose of slightly arresting the operated keys when they have been depressed far enough to couple them to the vibrating frame, and to thereby enable the operator to readily tell when they have been depressed sufficiently for that purpose, I provide the vibrating frame at its left hand pivotal point with a shouldered disk $Z^3$ Figs. 4, 5, 7, with which co-operates a shouldered arm $A^4$ spring-pressed against the disk. In the normal position of the parts the shoulder upon the disk stands a slight distance from the shoulder upon the arm, and it is arranged to come in contact with the shoulder upon the arm when an operated key has been depressed far enough and the vibrating frame lifted high enough to couple the key to said frame. The shoulders upon the disk and arm are not abrupt, and the shoulder upon the disk readily forces the arm aside and passes it, but when the shoulders come in contact the movement of the parts is sufficiently arrested to be readily perceptible to the operator, who has his finger upon the key, so that he may readily know when the operated key has been sufficiently depressed to effect the coupling of it to the vibrating frame, and can then release it (remove his finger from it) and operate the other keys necessary to complete the desired indication and registration. The provision of some such device as the disk $Z^3$ and arm $A^4$, for the purpose described, renders the operator less liable to accidentally depress the first key started so far as to cause the flange $Q^3$ of the vibrating frame to lock all of the other keys in the entire machine, as might be done if the first key were depressed too far.

I have shown the rear edges of the plates $S^3$ beveled off, to the end that when any key lever has been slightly depressed and caught upon the plate it may be disengaged from it by pressing the front end of the key upward, in case the wrong key has been started, but if it be desired to prevent the return of any keys after they have been started the result may be accomplished by employing plates $S^3$ with square rear edges, or by beveling them in the opposite direction to that shown.

As a part of the key coupling device it will be understood that the slotted extensions I of the key levers are nothing more than hooks, by which the keys become hooked to the vibrating frame, and for that purpose, they might, if desired, be of the shape indicated by the dotted line $X^3$ in Fig. 5. The vertical extensions I, having their forward edges curved to conform to the arc described by the rear edge of the flange $Q^3$ of the vibrating frame are employed for the purpose of locking the unoperated keys from movement until the operated keys are restored to normal position, as is common in machines of this class. This locking operation is, however, especially desirable in connection with my novel key coupler, since it prevents the operation of any keys in a given set after one key in that set has been started and caught upon the key coupler.

It has heretofore been proposed to successively couple keys in different sets to a vibrating frame or coupler bar by means of auxiliary coupling devices for the different sets of keys, but one of the difficulties with such devices as heretofore proposed has been that it was possible to release any key that had been started by simply pressing another key in the same set. With my improved coupling device it is not possible to release a partially depressed key by depressing another in the same set, since all of the unoperated keys are locked; and while it is possible to return the slightly depressed key to normal position by simply pressing it upward to such position, under the particular form of plates $S^3$ which I have shown in the drawings, yet the return of such keys in this manner may be entirely prevented, if desired, by employing plates $S^3$ having square rear edges, or rear edges beveled oppositely to those which I have shown; as before explained.

It will be understood that only one key in each set is to be operated at one time, and to prevent the operation of two or more at once any suitable form of stops or locking devices may be employed.

In the machine shown in the drawings I have shown the usual pivoted hangers Y³, suspended above the rear ends of the keys and arranged to operate in the usual well known manner.

The stems of the outer indicators of each set are bent laterally toward the middle of the set, Figs. 1 and 3, so as to bring all of the indicators of the set to a middle position, one approximately behind another. The spaces between the indicators of the three sets are filled by the indicators corresponding to the special keys between those sets, while the spaces at the extreme ends of the indicating line are occupied by the indicators of the special keys at the opposite ends of the rows of keys. Under this arrangement the indicators of the several sets are entirely separated from each other, so that no matter what keys are simultaneously operated their indicators will be fully exposed, to make the proper indication.

Having thus fully described my invention, I claim—

1. In a registering machine, the combination of a series of operating keys representing different values, a registering frame, and connections between said frame and keys for automatically coupling the keys to the frame at the beginning of its movement and giving it different degrees of movement according to the value of the key operated, substantially as described.

2. In a registering machine, the combination of a series of operating keys representing different values, a registering frame, a series of graduated lifters interposed between the keys and frame, and means for coupling the lifter of each operated key to the frame at the beginning of movement of the latter, substantially as described.

3. In a registering machine, the combination of a series of operating keys representing different values, a series of graduated lifters pivoted to the operating keys and interposed between them and the registering frame, and means for coupling the lifter of each operated key to the frame at the beginning of movement of the latter, substantially as described.

4. In a registering machine, the combination of a series of operating keys representing different values, a registering frame, a series of graduated lifters G interposed between the keys and frame and each provided with a notch N and shoulders O P, and a cross bar J co-operating with the shoulders P and rear sides of the lifters G, substantially as described.

5. In a registering machine, the combination of the key levers A, the series of graduated lifter plates G pivoted thereto and each provided with a notch N and shoulders O P, the registering frame Q having the cross rod K, and the cross bar J co-operating with the shoulders P and rear edges of the lifter plates G in the manner described.

6. In a registering machine, the combination of a series of operating keys representing different values, a registering frame actuated thereby and given different degrees of movement proportionate to the value of the operated key, a segment carried by said frame, a registering wheel mounted in a movable frame and provided with a driving pinion adapted to mesh with the segment, and means for shifting said frame at the ends of the opposite strokes of the operating keys, for the purpose of engaging the pinion with and disengaging it from the segment, substantially as described.

7. In a registering machine, the combination of a series of operating keys representing different values, a registering frame actuated thereby and given different degrees of movement proportionate to the values of the operated keys, a segment carried by said frame, a registering wheel mounted in a movable frame and provided with a driving pinion adapted to be thrown into and out of mesh with the segment, a rotary shaft, means interposed between the operating keys and shaft for rotating the latter, a cam upon said shaft, and connections between said cam and the frame which carries the registering wheel for moving said frame in one direction at each operation of the machine, substantially as described.

8. In a registering machine, the combination of a series of operating keys representing different values, a registering frame actuated thereby and given different degrees of movement proportionate to the values of the operated keys, a toothed segment carried by said frame, a registering wheel mounted in a movable frame and provided with a driving pinion adapted to be thrown into and out of mesh with the segment, a rotary shaft, means interposed between the operating keys and shaft for rotating the latter, two cams upon said shaft, and connections between said shaft and the frame which carries the registering wheel for shifting said frame in opposite directions to engage the pinion with and disengage it from the segment, substantially as described.

9. In a registering machine, the combination of the key levers A, the oscillatory registering frame Q, a series of graduated lifters G interposed between the key levers and registering frame and each provided with the notch N and shoulders O P, the cross-bar J co-operating with the shoulders P and rear sides of the lifters G, the segment W carried by the frame Q, the rocking frame A', the registering wheel C' mounted therein and provided with the driving pinion F' adapted to be thrown into and out of mesh with the segment W, the rotary shaft G', means interposed between the key levers A and shaft G' for rotating the latter, the cams L' M' upon the shaft G', and connections between said shaft and the frame A' for rocking the latter to carry the pinion F' into and out of engagement with the segment W, substantially as described.

10. In a registering machine, the combination of a series of keys representing different values, a registering frame controlled in its movements by said keys and moving different degrees at the operations of different keys, a segment carried by said frame, a registering wheel mounted in a movable frame and provided with a driving pinion adapted to mesh with the segment, and means actuated by the operating keys for shifting said frame at the ends of the opposite strokes of the keys, for the purpose of engaging the pinion with and disengaging it from the segment, substantially as described.

11. In a registering machine, the combination of the rotary shaft Z, the registering wheels mounted thereon, means interposed between said wheels and shaft for causing the shaft to pick up the registering wheels and rotate them with it in one direction, the spindle $G^2$ carrying the thumb-piece $I^2$, the beveled gears $E^2$ $F^2$ connecting the spindle $G^2$ and shaft Z, the notched disk $J^2$ fast upon the shaft Z, and the spring-pressed pawl $K^2$ engaging the disk $J^2$, substantially as and for the purpose described.

12. The combination of the rotary pinion $A^3$, the reciprocating racks $B^3$ $C^3$ adapted to alternately engage it, the spring-arm $K^3$ carried by said racks and provided with a laterally projecting stud or roller $L^3$, the lugs $M^3$ $N^3$ co-operating with said roller, and the guide rib $P^3$ co-operating with a projection $O^3$ carried by the racks, substantially as described.

13. The combination of the key levers A, the vibrating frame $E^3$, means for coupling the operated keys to said frame, the rotary pinion G', the reciprocating plate $D^3$ carried by the frame $E^3$ and provided with the racks $B^3$ $C^3$ adapted to alternately engage the pinion $A^3$, the spring-arm $K^3$ carried by the plate $D^3$ and provided with the roller $L^3$, the lugs $M^3$ $N^3$ co-operating with the roller $L^3$, the guide-rib $P^3$ co-operating with the projection $O^3$ on the plate $D^3$, the ratchet $W^3$ turning with the pinion $A^3$, and the pawl $N^3$ co-operating with the ratchet, substantially as described.

14. In a registering machine, the combination of two or more sets of operating keys, a vibrating frame common to all of the keys, two or more spring-pressed sliding plates mounted upon the vibrating frame, one plate overlying each set of keys and adapted to co-operate with hooks upon the keys, and means for preventing retrograde movement of said frame after it has been displaced from normal position, substantially as and for the purpose described.

15. In a registering machine, the combination of two or more sets of operating keys, a vibrating frame provided with a rearwardly projecting flange, two or more spring-pressed sliding plates mounted upon the flange and projecting beyond its rear edge, one plate overlying each set of keys and adapted to co-operate with hooks thereon, and means for preventing retrograde movement of said frame after it has been displaced from normal position, substantially as described.

16. In a registering machine, the combination of two or more sets of key levers A, provided with the vertical extensions I having the slots $R^3$, the vibrating frame $E^3$ overlying all of the keys and provided with the rearwardly projecting flange $Q^3$, the sliding plates $S^3$ mounted upon the flange $Q^3$ and projecting beyond its rear edge, the springs $U^3$ normally pressing the plates $S^3$ rearward, and means co-operating with the frame $E^3$ to prevent retrograde movement of the latter after being displaced from normal position, substantially as and for the purpose described.

17. The combination of the two or more sets of key levers A, the vibrating frame $E^3$, the coupling devices for successively coupling the operated keys to said frame, the shouldered disk $Z^3$ carried by said frame, and the shouldered arm $A^4$ spring-pressed into engagement with the disk, substantially as described.

18. In a cash register and indicator, the combination of two or more sets of key levers A, the several sets of keys being separated by the special keys, the vertically-guided indicator rods E, the indicating tablets F carried thereby, the stems of the outer tablets in each set being bent toward the middle of the set, to bring all of the tablets of each set into position approximately one behind the other and distinctly separate the several sets of tablets, and the tablets of the special keys occupying the spaces between the said several sets of tablets, substantially as shown and described.

THOMAS CARNEY.

Witnesses:
WILLIAM B. SULLIVAN,
PEARL N. SIGLER.